United States Patent
Causse et al.

(10) Patent No.: US 8,392,534 B2
(45) Date of Patent: Mar. 5, 2013

(54) DEVICE FOR ACCESS TO DATA ABOARD AN AIRCRAFT

(75) Inventors: Jean-Arnaud Causse, Plaisance du Touch (FR); Pierre Gamet, Blagnac (FR); Sylvain Yan, Labastidette (FR)

(73) Assignee: Thales, Neuilly sur Seine (FR)

( * ) Notice: Subject to any disclaimer, the term of this patent is extended or adjusted under 35 U.S.C. 154(b) by 82 days.

(21) Appl. No.: 13/178,260

(22) Filed: Jul. 7, 2011

(65) Prior Publication Data

US 2012/0072482 A1 Mar. 22, 2012

(30) Foreign Application Priority Data

Jul. 9, 2010 (FR) ...................... 10 02893

(51) Int. Cl.
*G06F 15/16* (2006.01)

(52) U.S. Cl. .......................... 709/219; 709/217; 709/218

(58) Field of Classification Search ................. 709/219, 709/217, 218, 220; 345/765; 701/3, 16, 701/213; 717/121; 712/36

See application file for complete search history.

(56) References Cited

U.S. PATENT DOCUMENTS

| 5,557,798 | A | 9/1996 | Skeen et al. |
| 5,893,091 | A | 4/1999 | Hunt et al. |
| 8,135,807 | B2 * | 3/2012 | Jackson ........................ 709/220 |
| 8,301,867 | B1 * | 10/2012 | Mazuk et al. .................... 712/36 |
| 2002/0111720 | A1 * | 8/2002 | Holst et al. ........................ 701/3 |
| 2003/0058277 | A1 * | 3/2003 | Bowman-Amuah .......... 345/765 |
| 2003/0130791 | A1 * | 7/2003 | McIntyre ...................... 701/213 |
| 2006/0206246 | A1 * | 9/2006 | Walker ............................ 701/16 |
| 2011/0296379 | A1 * | 12/2011 | McCready .................... 717/121 |
| 2012/0101663 | A1 * | 4/2012 | Fervel et al. ...................... 701/3 |
| 2012/0109424 | A1 * | 5/2012 | Fervel et al. ...................... 701/3 |

FOREIGN PATENT DOCUMENTS

EP 1130845 A2 9/2001

* cited by examiner

*Primary Examiner* — Le H Luu
(74) *Attorney, Agent, or Firm* — Baker Hostetler LLP

(57) ABSTRACT

A device for access to data by clients aboard an aircraft, each of the clients being associated with an avionics application. Each of the clients includes a facade allowing access by the avionics applications to the data stored on the server. The facade includes means for signing up of the avionics application associated with the client to a subscription to a modification of a data item, and means for filtering notifications of modifications on the data sent by the data server as a function of the subscriptions of the avionics application associated with the client, and for warning the avionics application associated with the client of a modification of a data item to which it has subscribed.

5 Claims, 4 Drawing Sheets

DEVICE FOR ACCESS TO DATA ABOARD AN AIRCRAFT

CROSS-REFERENCE TO RELATED APPLICATIONS

This application claims priority to foreign French patent application No. FR 10 02893, filed on Jul. 9, 2010, the disclosure of which is incorporated by reference in its entirety.

FIELD OF THE INVENTION

The invention relates to access to databases aboard an aircraft.

BACKGROUND OF THE INVENTION

According to the known art, the storage of data aboard an aircraft is carried out on various onboard databases. Each avionics system is responsible for the data that it utilizes. This distributing of the data simplifies the design of each system, but has the following drawbacks: proliferation of databases, duplication of data between various systems with risks of inconsistencies, significant consumption of storage space with no possibility of factorization, and complication of the operations for updating these databases.

Devices of DDS (Data Distribution Service) type are already known, which make it possible to communalize the databases so as to share them (gain in consistency, ease of maintenance and development of applications, optimization in the use of the databases, etc.). These devices allow independence of the client applications in relation to the provision of the data and their location. However, such devices are applied only on the ground, since they do not address the specific constraints of the avionics sector. Indeed avionics networks, for example of AFDX (Avionics Full DupleX) type, are not designed for transactional working, but are suited rather to the broadcasting of information from a sender to several receivers. This poses a problem in particular for the management of accesses to semi-static data, that is to say data that is able to be modified. The direct use of a device of DDS type in the avionics sector is therefore not conceivable.

SUMMARY OF THE INVENTION

The invention is aimed at alleviating the problems cited previously by proposing a device for access to data, in particular semi-static data, aboard an aircraft by avionics applications independently of the location of the storage of the data and with extended service qualities such as fault tolerance or load distributing.

For this purpose, the subject of the invention is a device for access to data by clients aboard an aircraft, each of the clients being associated with an avionics application, the said data being stored on at least one data server installed aboard the aircraft, the said data being write-accessible and able to be modified, characterized in that the server comprises means for notifying the set of clients of modifications on the data that it stores, and in that each of the clients comprises a facade allowing access by the avionics applications to the data stored on the server, the said facade comprising:
  means for the signing up of an avionics application to a subscription to a modification of a data item,
  means for filtering the notifications sent by the data server as a function of the subscriptions of the avionics application, and for warning the avionics application of a modification of a data item to which it has subscribed.

The advantage of the invention is that it is more suited to an AFDX network using notably virtual channels (Virtual Link) that is to say comprising a sender and several receivers. This solution therefore harnesses the broadcasting (or multicasting) capacity of AFDX. The server broadcasts a notification at each modification of the semi-static base. The facades are charged with processing these notifications and with uploading only those that are relevant (that is to say corresponding to the subscriptions) to the application client.

The advantage of this is also to unburden the servers of the management of the subscriptions which deal solely with the publication of events. Thus, the servers are not overburdened with an algorithm for filtering sending of events, nor for managing subscriptions.

The advantage of this is also to simplify, at the level of the servers, the processing during the restarting of an application client. On startup, an application subscribes via a facade to the changes of state of the semi-static data pertinent to it. These subscriptions are kept and managed solely at the level of the facade. The choice to keep the subscriptions only at the level of the facades avoids the need to process at the level of the server the cases of relaunching of application clients. Indeed, if the subscriptions were managed at the server level, it would be necessary to reflect the disappearance of each client in the subscriptions base. Moreover in the case of replicas of servers, it would be necessary to duplicate the subscriptions on the various servers and to verify the consistency thereof. In the case of relaunching of an application client, the facade loses all the subscriptions. On restarting, the client subscribes anew to the facade.

The use of an intermediary (a facade) between an avionics application and the servers (in the case where the data are distributed over several servers) makes it possible to mask the physical location of the data from this avionics application. This solution is compatible with the use of redundant servers which guarantee access to the data against a certain fault level.

According to a preferred embodiment of the invention, the facades are distributed between at least a first and a second group, the first group receiving directly the notifications of modifications on the data sent by the server, the facades belonging to the first group furthermore comprising means for sending the said notifications of data modifications to the facades belonging to the second group, the sending of the notifications to the facades of the second group being performed after the said notifications have been filtered and transmitted to the avionics applications associated with the clients of the facades of the first group. The job of the first group is to retransmit the notifications to a second group and so on and so forth in cascade to possible other groups.

The advantage of this characteristic is to protect the device according to the invention against a killing message. A killing message is a notification comprising an anomaly the consequence of which is, when it is received and processed by a client application, to cause a malfunction or indeed a complete shutdown of the latter. Massive broadcasting of such a message is therefore very prejudicial to flight systems using avionics applications. By not broadcasting the notifications to all the facades at the same time, but only to a first group, the harmful impact of the message is limited. In the case of a killing message, the first facade group would crash, but without contaminating the subsequent groups.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

In the device for access to data aboard an aircraft according to the invention, the data are stored on centralized databases hosted on at least one server (ADBS1).

To satisfy the avionics constraints, hardware redundancy of this server is effected through one or two replicas.

The server hosts so-called semi-static data, that can be modified. Stated otherwise, the databases are open not only for reading, but also for writing.

Figure 1:
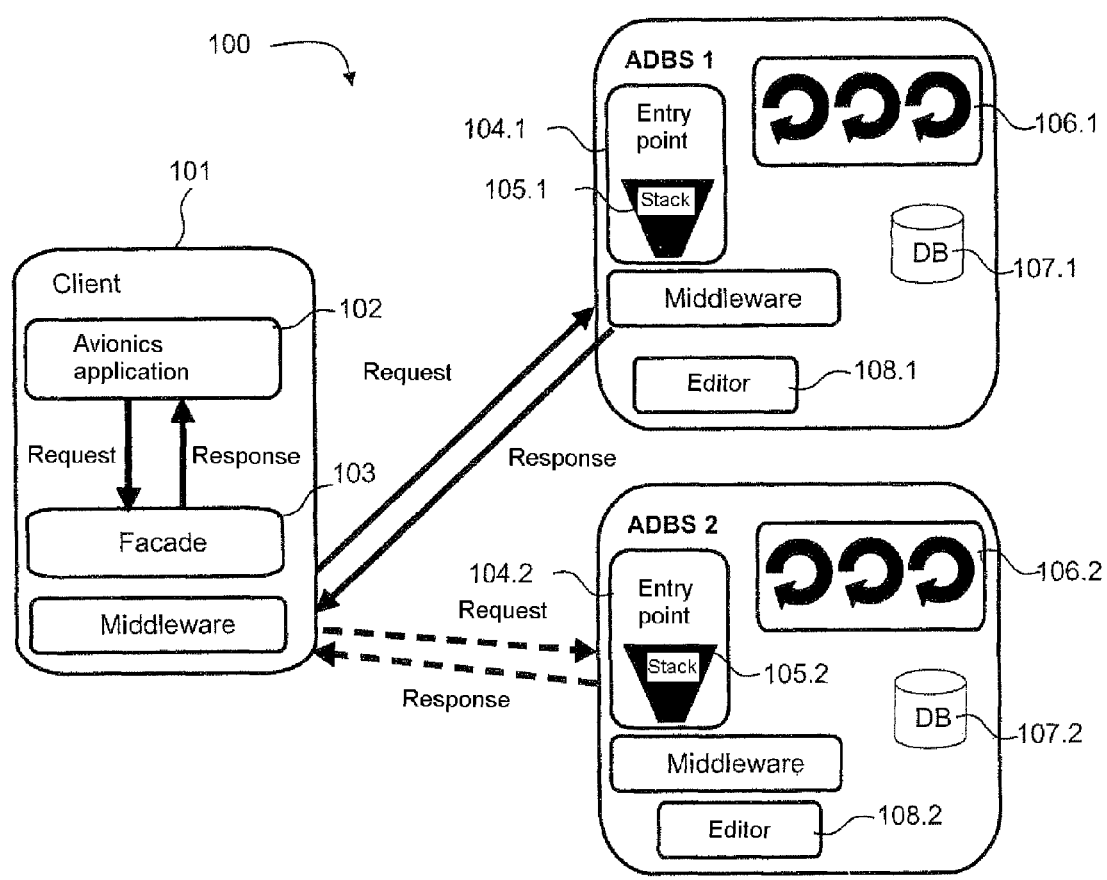
FIG. 1 represents an exemplary implementation of the device for access to data according to the invention.

FIG. 1 represents an exemplary implementation of the device for access to data according to the invention. The device comprises a first server ADBS1 and a second server ADBS2 replicating the data of the first server ADBS1 so as to ensure redundancy. The device also comprises at least one client 101. Each of the applications requiring access to the data is associated with its own inherent client 101. A client 101 comprises a facade 103 which is an intermediary between an avionics application 102 and one (or more) server(s) for access to the data. An avionics application 102 requires read-access and/or write-access to the data stored on the server for example data relating to aerial navigation, Flight plan, Weather or NOTAMs. The role of the facade 103 is therefore to offer the avionics application 102 access to the data. The clients and the servers dialogue by way of a software communication layer termed middleware.

According to a variant embodiment of the invention, the clients are grouped together in families. These families are, for example, three in number: (i) LocalClient, for the client colocated with a data server (Template "Database Server on Favoured Client), (ii) AvionicClient, for the avionics clients, and (iii) OWClient, for the clients of the avionics part termed "Open World".

In this case, the family to which the sender client belongs is indicated by the facade in the request.

The advantage of this characteristic is to make it possible to provide different service qualities as a function of the client applications.

The two servers ADBS1, ADBS2 exhibit a similar structure. A server comprises: an entry point (or Front End) 104.1, 104.2 for managing the requests sent by the clients, a set (or Pool) of requests managers 106.1, 106.2, at least one database 107.1, 107.2 and an editor (or "publisher") 108.1, 108.2. The role of the set of requests managers 106.1, 106.2 is to process the requests. The role of a requests manager is to process a single request at a time. The entry point 104.1, 104.2 comprises a stack 105.1, 105.2 for storing pending requests. The editor 108.1, 108.2 makes it possible to publish modifications of a data item destined for the clients. The editor contributes to the implementation of a service relating to publication and subscription to data modifications, which service is detailed further on in the description.

The entry point 104.1, 104.2 of the server is charged with the management of the requests sent to it by the clients. The management of the requests comprises:

the recovery of the requests sent by the clients, the verification of the stack 105.1, 105.2 of pending requests so as to check that it is not saturated (flow check), the validation of the sender client's access rights (access check), the verification that the sender has not exceeded its quota of pending requests (flow check), the storage of the new requests in the stack 105.1, 105.2 of requests pending processing, the time-stamping of each request to allow monitoring of the processing of each request, the monitoring of the proper conduct of the set of requests managers 106.1, 106.2.

The entry point regularly collects the requests in the lower communication layers before the latter are saturated (in the case of abundance for example).

Advantageously, a server comprises several stacks of requests that are pending processing, each of the stacks being dedicated to a client family, the requests being read-requests in respect of data sent by the facades of the clients.

In the case where the clients are grouped together in families, the entry point 104.1, 104.2 comprises several stacks of requests that are pending processing. Each of the stacks is dedicated to a client family. This makes it possible to set an allowance on the possible saturations of the stack of requests. For example, it is possible to dedicate a stack to the requests coming from the OW (the clients of the avionics part termed "Open World"). In the case of an abundance of requests originating from the OW, only the stack dedicated to the OW is saturated. Henceforth, the server refuses all new requests coming from the OW but continues to stack up the requests originating from avionics equipment. This principle of a dedicated stack allows self-protection for example from an OW application malfunctioning by sending requests continuously. According to the same scheme, it is also possible to incorporate a stack for the requests of a privileged client. In the architecture template where the server is colocated with a privileged client (NavDB and FMS) it is possible to envisage protecting the requests of this privileged client by virtue of a dedicated stack. This option makes sense only in the case where the privileged client and the server operate on one and the same computer.

This option is not conceivable for the processing of the write requests, since it does not make it possible to guarantee conservation of the order of the requests.

The role of the entry point in the monitoring of the set of requests managers is based:

on the local (and remote) time-stamping of the requests, on the number of times each request is taken into account (for self-protection from the killing message), on the degree of fill of the stack(s) of requests that are pending processing.

This information is used to supply statistics within the framework of a mechanism for distributing load between the servers (or load-balancing) making it possible to determine each server's availability level.

The role of the entry point is to manage the stack of requests pending processing. It is not charged with the execution of the request proper. This work is delegated to dedicated processes: the requests managers. These processes perform the reading or writing operation in the corresponding database.

Each server comprises several requests managers grouped into a set dubbed set or "pool" of requests managers 106.1, 106.2.

The job of each requests manager is to process one request at a time. It pulls off the first request that is pending processing in the stack 105.1, 105.2 managed by the entry point 104.1, 104.2. The requests managers must not contain remanent data beyond the processing of each request. These requests managers are said to be stateless. This characteristic makes it possible to avoid intermediate state storage. In the case of shutdown of a requests manager, the latter restarts immediately without having to initialize a prior state. The request which was undergoing processing during the shutdown of a requests manager is resumed by another requests manager. A requests manager restarting after a shutdown handles the first request that is pending processing in the stack.

The set of requests managers contains a minimum of three instances of a processing process so as to alleviate the problem of the killing message. Then, if the processing of a request causes the shutdown of two requests managers consecutively, then the processing of this request is interrupted so as to avoid killing all the managers of the set.

In the case where the clients are grouped together in families, each requests manager is associated with a priority so as favour a family of clients. Just as for the entry point, it is possible to utilize the information giving the family to which the client originating the request belongs.

For example, a requests manager with higher resource allocations may be reserved for the local client so as to favour the response times for these requests. This option makes sense only in the case of the privileged client. Likewise, it is possible to confine the OW requests to a single requests manager with a lower resource allocation than the average. This option is not conceivable for the processing of write requests, since it does not make it possible to guarantee the conservation of the order of the requests.

Figure 2:
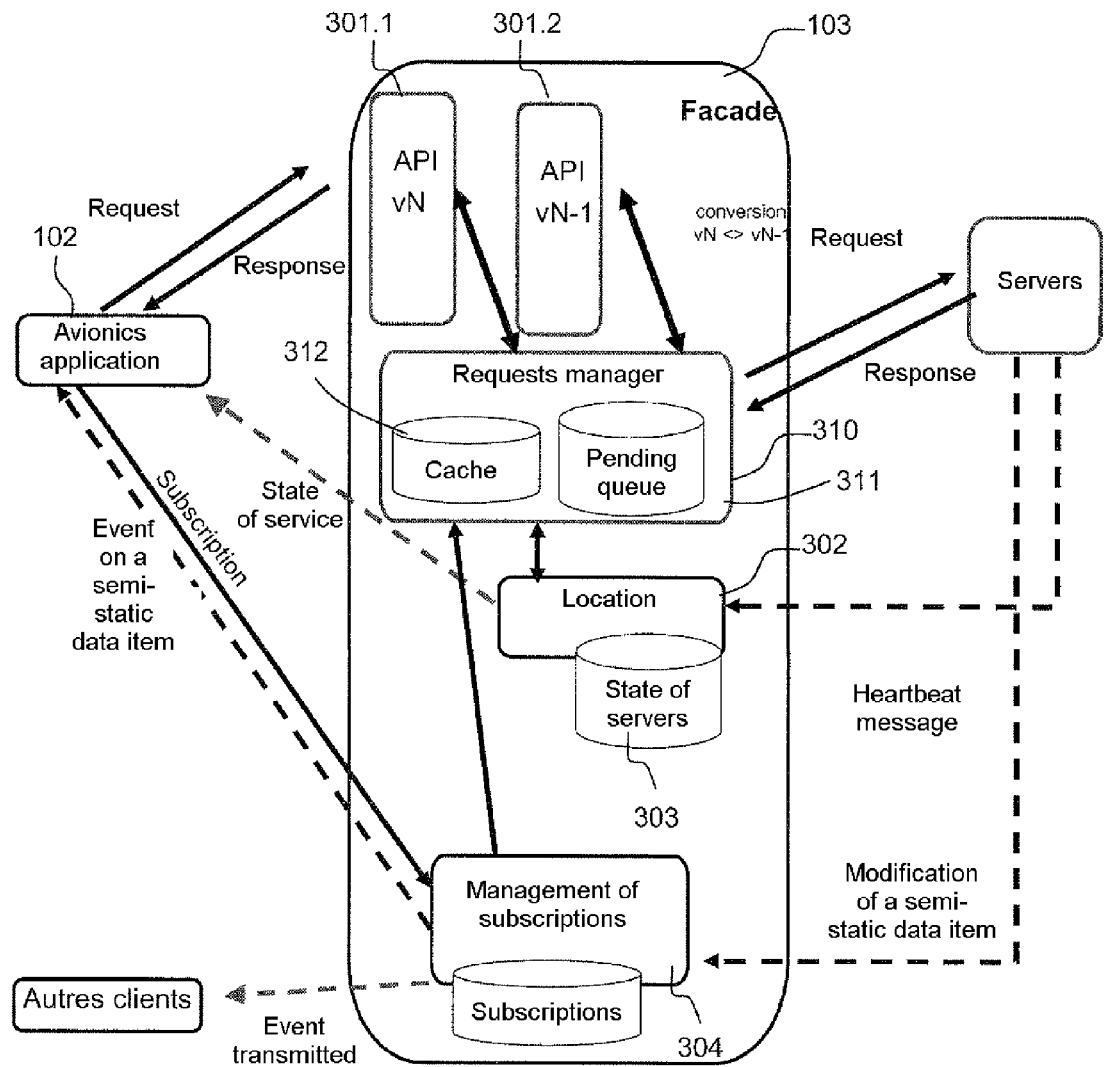
FIG. 2 represents the internal operation of a facade.

FIG. 2 represents an example of internal operation of a facade 103. The role of a facade is to offer an avionics application 102 access to the data hosted on the servers. The knowledge of the servers to be used is found client side. In order to mask the location of the databases to the avionics applications, the facade plays the role of intermediary between the client and the access to the servers. The facade comprises:
- an interface 301.1, 301.2 for access to the data (API) of the bases while ensuring a certain upward compatibility of the various versions of interface,
- means 302 for locating the server(s) hosting the data item requested by the client,
- means 303 for receiving the servers' heartbeat messages so as to ascertain the availability thereof,
- means for returning a request to the backup server in the case of a fault with the main server,
- means 304 for managing the client's subscriptions to the changes of the semi-static data, these means comprising:
  - means for receiving the notifications sent by an editor 108.1, 108.2 for the semi-static data.
  - means for the subscription of an avionics application 102 to a subscription to a modification of a data item,
  - means for filtering the notifications sent by the data server as a function of the subscriptions of the avionics application 102, and for warning the avionics application 102 of a modification of a data item to which it has subscribed.

A facade is designed in a modular manner so as to adapt to the requirements of the client for which it is intended. Installed aboard the facade are only the interfaces 301.1, 301.2 required by the client. Indeed, it is not useful to provide all the clients with accesses to all the databases managed by the device.

This principle of modularity of the facade makes it possible in the same manner to provide several versions 301.1, 301.2 of one and the same interface. Indeed, it is necessary to be able to upgrade the device without imposing the modification of a client domain application. The facade uses the most recent level of exchanges internally with the servers, but performs the conversion with the interface version used.

The facade also comprises a manager 310 of pending requests. The essential job of this manager is to manage the requests that are sent to the servers making up the database service and are still pending (that is to say: whose facade has not yet received the response).

The generic processing of a request comprises the following steps:
- the marking of the request with the current time,
- in the case of a read request, a prior search in an internal cache memory 312 (storage local to the facade),
- for a read and if the data item is available in the cache memory 312, the response to the client,
- otherwise the determination of the server managing the base concerned,
- the construction of a request message and dispatch to the server,
- the placing in a pending queue 312 of the request undergoing processing,
- the triggering of a monitoring timer for this request,
- the processing of the response comprising steps consisting in:
  - in the case of success: popping the pending request from the stack and responding to the application and optionally updating the cache,
  - in the case of failure: applying the chosen fault-tolerance policy for a possible resend
  - at the end of the attempts: uploading the definitive error to the application.

The resending of the request to another server in the case of failure depends on several criteria:
- The cause of the previous failure if feedback has been returned by the server. It is unnecessary to return a message "which kills" detected at the server level.
- The fault tolerance policy (one or more replicas),
- The availability of a "replica" according to its service state.

Advantageously, the facade comprises means 305 for dispatching a request to the least loaded server. The applications send requests to the servers to access the data. These means 305 are used in the case of an implementation of a function for load distribution (or "load balancing") between the servers. This characteristic therefore makes it possible to prevent one server from being overloaded by requests while another is practically unused. These means 305 use for example the degree of fill of the stack(s) of requests pending processing of the servers to determine the least loaded server.

The device for access to data according to the invention makes it possible to inform a set of subscribed clients of the modification of a semi-static data item without the server hosting the data being aware of this set of clients in a fixed and prior manner. The advantage of this function is to reduce the coupling between the server and the user clients of the semi-static data. This makes it possible to construct a more flexible system.

The informing of the modification of a semi-static data item is an event-based function. The subscribed clients are forewarned only when a change of state of a data item arises. This function comprises a filtering mechanism. As such, the subscribers receive only the subset of events to which they have subscribed. It is up to each subscriber to process or not process the events received.

Figure 3:
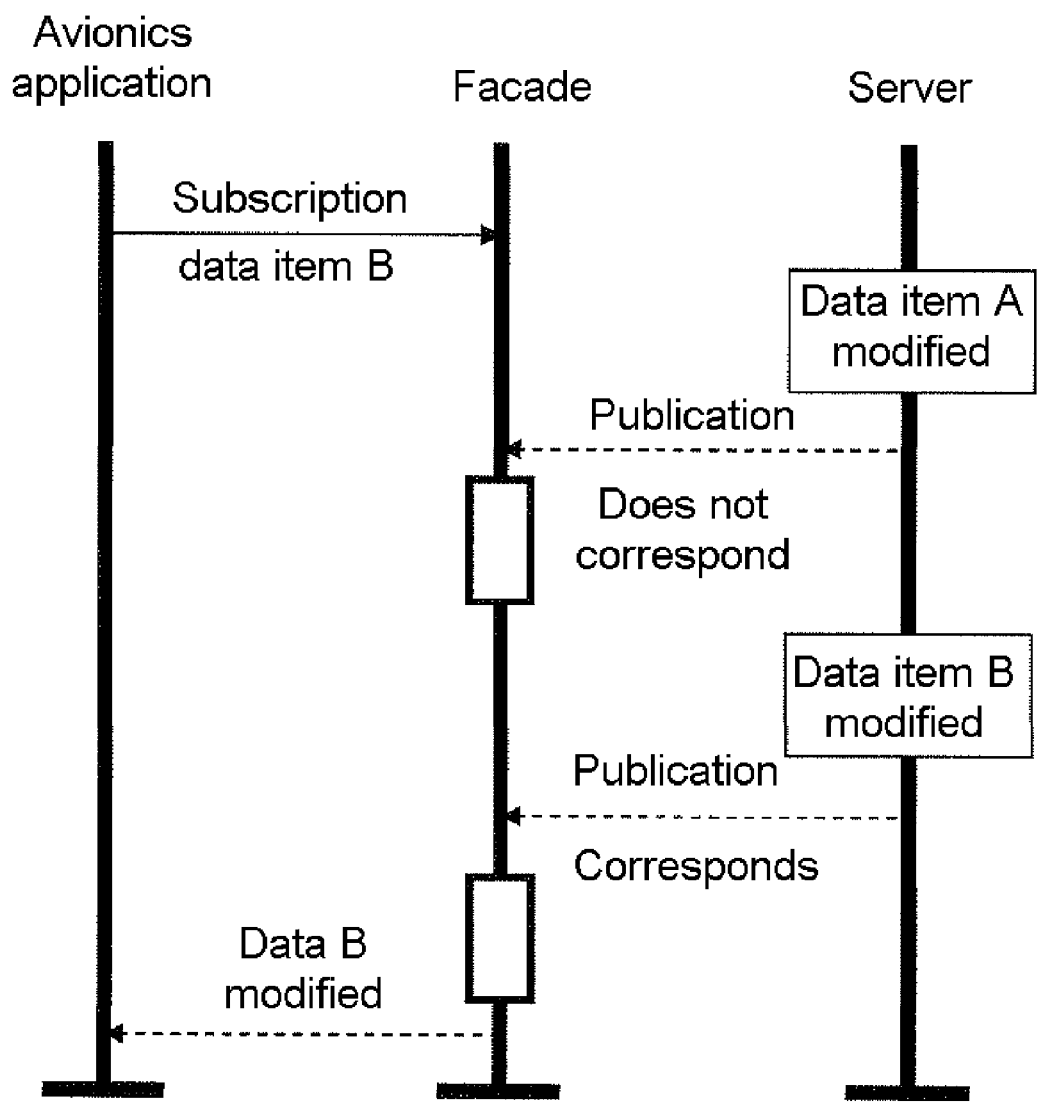
FIG. 3 represents an example of the progression of an update of a data item with the device according to the invention.

FIG. 3 represents an example of the progression of an update of a data item with the device according to the invention. In practice, an application subscribes to a facade. For example, the application represented subscribes to the modifications on a data item B. The server publishes, in the form of events, changes of state of data to the events manager. The facade informs the avionics application if the latter has subscribed to the modifications of the data item. In the example, upon modification of a data item A the facade receives a notification published by the server, but does not transmit it to the application which has not subscribed in respect of this data item. But upon modification of the data item B, the facade receives a notification published by the server and transmits it to the application which has subscribed in respect of this data item.

The changes of state published by the editor 108.1, 108.2 are for example a modification of a data item, a creation of a data item or a destruction of a data item.

An event comprises: references of the data item making it possible to identify it, a type of event (modification, creation, destruction), a time-stamping of the occurrence of the event, or references of the server that performed the publication.

The means for the signing up of an avionics application 102 to a subscription to a modification of a data item allow various types of subscriptions for example: on all the events, on a type of event, on the whole of a database, on a family of data (for example: Waypoints, Flight Plans, NOTAMs), or on a particular data item.

The publication is the responsibility of the master server hosting the semi-static data. There may moreover be several types of semi-static databases which may or may not be hosted on one and the same server.

After the success of a write request, the server will broadcast on a dedicated AFDX virtual channel the information relating to a new semi-static data item value to all of the facades. These facades are charged with determining whether this signalling is pertinent to the client application as a function of the subscriptions carried out at the outset.

Figure 4:
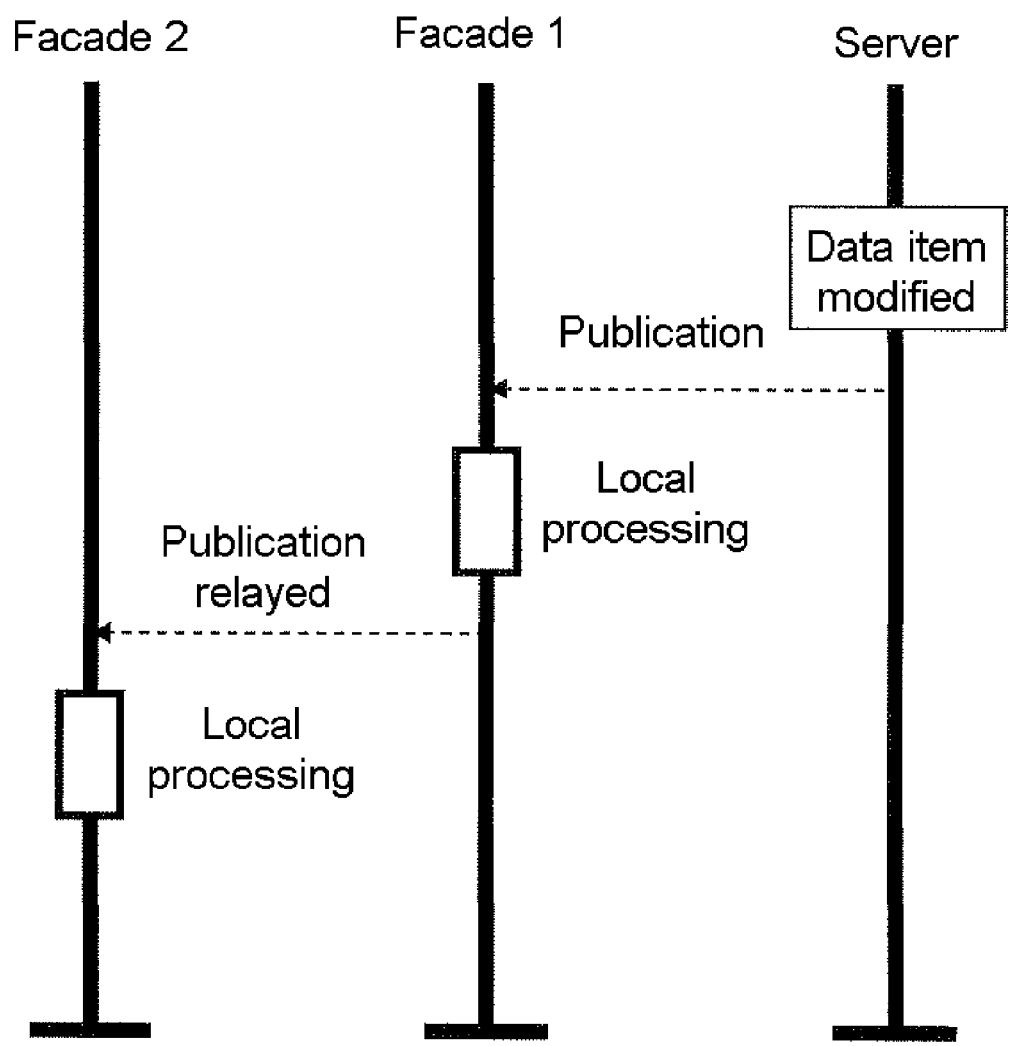
FIG. 4 represents an example of the progression of an update of a data item in a preferred embodiment of the invention.

According to a preferred embodiment of the invention, the facades 103 are distributed between at least a first and a second group. FIG. 4 represents the progression of an update of a data item in this preferred embodiment of the invention. The first group (Facade 1) receives directly the notifications of modifications on the data sent by the server. The facades belonging to the first group furthermore comprise means for sending the said notifications of data modifications to the facades belonging to the second group (Facade 2). However, the sending of the notifications to the facades of the second group is performed only after the said notifications have been processed and optionally transmitted to the avionics applications associated with the clients of the facades of the first group (called local processing in the figure).

The principle of publication is based on the broadcasting to all of the facades of the events that have occurred on the semi-static data. This choice presents the risk of a notification message that might cause the set of facades to crash. To protect the device from a killing message, one solution is to broadcast the notifications only to a first-level sub-group of the facades, rather than to all of them. The job of this first group would be to retransmit the notifications to a second group and so on and so forth in cascade. In the case of a killing message, the first facade group would crash, but without contaminating the subsequent groups.

The invention claimed is:

1. A device for access to data by a plurality of clients aboard an aircraft, each of the clients being associated with an avionics application, the data being stored on at least one data server installed aboard the aircraft, the data being write-accessible and able to be modified, wherein
   the data server comprises means for notifying the plurality of clients of modifications on the data that it stores;
   each client comprises a facade allowing access by the avionics application associated with the client to the data stored on the data server, the facade comprising:
      means for signing up of the avionics application associated with the client to a subscription to a modification of a data item; and
      means for filtering notifications of modifications on the data sent by the data server as a function of the subscriptions of the avionics application associated with the client, and for warning the avionics application associated with the client of a modification of a data item to which it has subscribed;
   the facades are distributed between at least a first and a second group, the first group directly receiving the notifications of modifications on the data sent by the data server; and
   the facades belonging to the first group further comprise means for sending the notifications of data modifications of modifications on the data to the facades belonging to the second group, the sending of the notifications of modifications on the data to the facades of the second group being performed after the notifications of modifications on the data have been filtered and transmitted to the avionics applications associated with the clients of the facades of the first group.

2. The device according to claim 1, wherein the applications sending requests to the data server to access the data, the facade comprises means for dispatching a request to the least loaded server.

3. The device according to claim 1, wherein
   the clients are grouped together in families, and
   a family to which a client belongs is indicated to the data server by the facade of the client in a request.

4. The device according to claim 3, wherein a server comprises several stacks of requests that are pending processing, each of the stacks being dedicated to a client family, the requests being read-requests in respect of data sent by the facades of the clients.

5. The device according to claim 1, wherein
   the device comprises a plurality of servers, and
   the facade comprises means for dispatching a request to a server included in the plurality of servers which is least loaded with requests.

* * * * *